Figure 1:
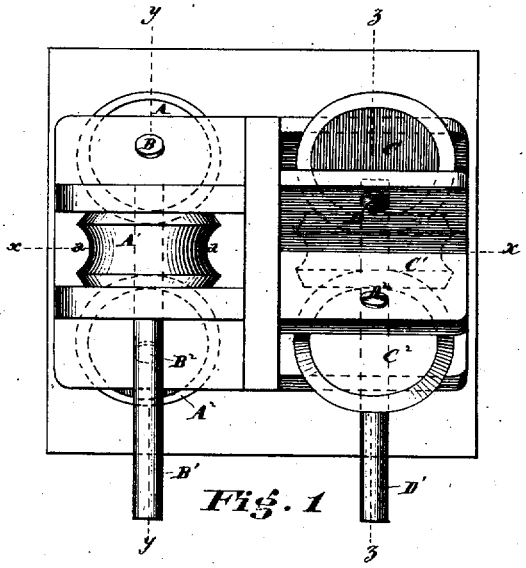

3 Sheets—Sheet 1.

S. P. M. TASKER.

Machine for Reducing the Diameter of Metal-Tubes.

No. 8,774. Reissued June 24, 1879.

Attests

John Dolley Jr

Inventor

Stephen P. M. Tasker

By his Attorneys,

W. C. Manninger,

J. Bonsall Taylor.

3 Sheets—Sheet 2.

S. P. M. TASKER.

Machine for Reducing the Diameter of Metal-Tubes.

No. 8,774. Reissued June 24, 1879.

Attests

Thos Kennedy

John Dolley Jr

Inventor

Stephen P. M. Tasker

By his Attorneys,

W. C. Strawbridge,

J. Bonnell Taylor.

S. P. M. TASKER.

Machine for Reducing the Diameter of Metal-Tubes.

No. 8,774. Reissued June 24, 1879.

Attest:

John Dolley Jr

Inventor

Stephen P. M. Tasker

By his Attorneys,

W. C. Rheuwerdt,

J. Bonsall Taylor.

UNITED STATES PATENT OFFICE.

STEPHEN P. M. TASKER, OF PHILADELPHIA, PENNSYLVANIA.

IMPROVEMENT IN MACHINES FOR REDUCING THE DIAMETER OF METAL TUBES.

Specification forming part of Letters Patent No. 175,522, dated March 28, 1876; Reissue No. 8,774, dated June 24, 1879; application filed April 11, 1879.

*To all whom it may concern:*

Be it known that I, STEPHEN P. M. TASKER, of the city and county of Philadelphia, in the State of Pennsylvania, have invented a new and useful Improvement in Reducing the Diameter of Metal Tubes, of which the following is a full, clear, and true description, reference being had to the accompanying drawings, forming part hereof.

My invention consists of the combination of a series of sets of grooved rolls, substantially in the following manner: first, each set to consist of three or more rolls arranged at an angle to each other in such manner that their respective grooves coincide at one point to form the groove or pass through which the tube or article to be reduced is caused to travel; second, the pass or rolling-orifice of each succeeding set to be of a less diameter than that of the preceding set throughout the series; and, third, the rolls of each set to be so respectively placed that any given roll in a set is placed out of plane or line with the corresponding roll in the set immediately preceding, so that the groove of any given roll comes over any projection formed on that longitudinal portion of the tube which traveled beneath the intersection of the grooves of two immediately-preceding rolls, whereby any projection or the portion beneath the previous intersection is obliterated or rolled down true.

It further consists in the combination of a series of sets of rolls, arranged as above set forth, with a guide to properly conduct the tube into the sets.

It further consists in the process of reducing tubing by rolling it through a series of sets of rolls arranged as first above set forth.

The object of the invention is the reduction of tubing of a large diameter to tubing of less diameter, and the accomplishment of the same without leaving longitudinal projections, raised portions, or ribs upon the tubing.

Any desired number of sets may be employed in the train or series; but each set should consist of a similar number of rolls.

I prefer having an odd number of rolls in each set, in order to have the driving-wheels all in the same plane, and for convenience of connecting the whole train with spur-gearing.

As the tube is diminished in size it is gradually elongated, and consequently the speed of each succeeding set of rolls should be increased over that of the preceding set. As the bearing of the rolls is evenly distributed upon the circumference of the tube, the use of a mandrel may be dispensed with. Appropriate guides are used for conducting the tube to the different sets of rolls. A convenient form of the same is represented in the drawings.

Figure 2:
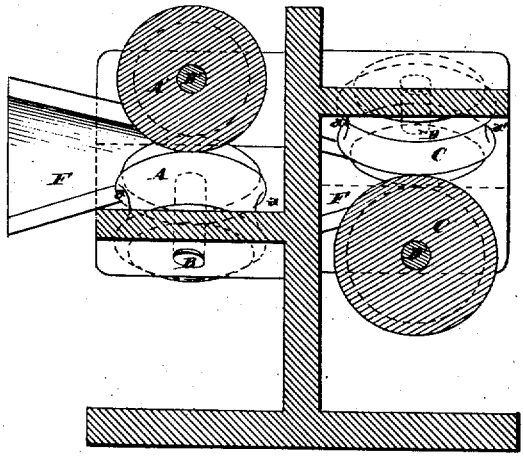
Figure 3:
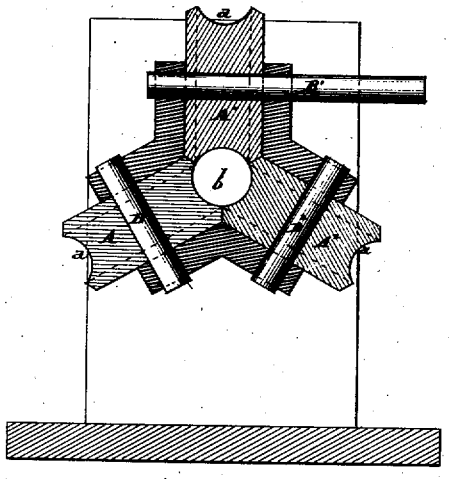
Figure 4:
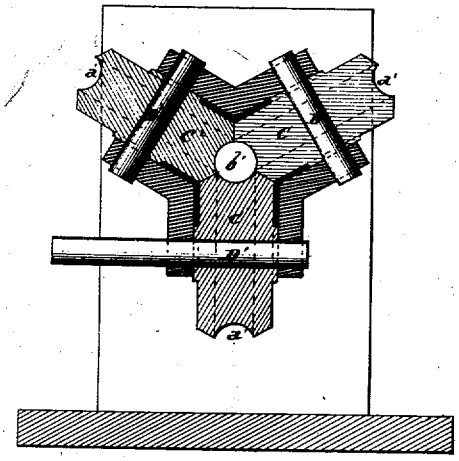
Figure 6:
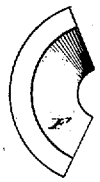
Figure 5:
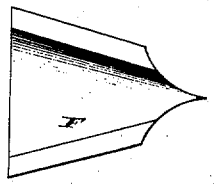
Figure 7:
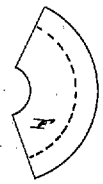

In the accompanying drawings, Figure 1 is a plan view of a convenient form of apparatus for carrying out my invention. Fig. 2 is a longitudinal section of the same on the line *x x* of Fig. 1. Fig. 3, Sheet 2, is a cross-section of the same on the line *y y* of Fig. 1, showing the arrangement of the set of rolls A, $A^1$, and $A^2$. Fig. 4 is a similar view of the same on the line *z z* of Fig. 1, showing the arrangement of the set of rolls C, $C^1$, and $C^2$. Fig. 5 is a face view of one of the guides F. Figs. 6 and 7 are end views of the same.

Similar letters of reference indicate corresponding parts wherever used.

I have represented but two sets of rolls in the drawings, instead of a series of more than two sets, for greater clearness in illustration of the arrangement of the rolls in any given set in respect to those of any other set immediately preceding or following that first considered.

The rolls A, $A^1$, and $A^2$ (shown clearly in Fig. 3) are of equal diameter, and are provided with grooves *a a a*, which meet each other to form a central pass or rolling-orifice adapted to shape the circumference of the tube as it passes through such rolling-orifice. The diameter of the pass *b*, formed by the grooves of the first set of rolls, should best be of somewhat smaller diameter than that of the tube which enters the same in commencing the process of its reduction. The shafts B, $B^1$, and $B^2$ and those of each succeeding set of rolls are supported by any suitable frame-work.

C, $C^1$, and $C^2$ are a set of rolls on the shafts D, $D^1$, and $D^2$. (Seen in detail in Fig. 4.) The grooves *a′ a′ a′* of these rolls are of such curvature as to form a pass or opening, *b′*, of smaller diameter than the next preceding pass or opening, *b*, of the rolls A, $A^1$, and $A^2$, so as to effect further reduction of the tube.

The shafts C, $C^1$, and $C^2$ of the second set of rolls are so arranged in relation to the shafts B, $B^1$, and $B^2$ of the first set as to cause the central portion of the grooves of the rolls C $C^1$ $C^2$ to come over such portions of the tube as were beneath the intersectional portion of the grooves of the rolls A $A^1$ $A^2$, whereby an equal pressure on the whole circumference of the tube, as seen in Figs. 3 and 4, is secured, and any projections or other longitudinal irregularities caused by the intersectional portions of the grooves of the passes entirely effaced.

I have, as hereinbefore explained, shown in the drawings but two sets of rolls as an illustration; but it will be understood that any desired number of sets may be employed, according to the extent to which reduction is desired.

For conducting the tube to each set of rolls are guides F, one of which is shown detached from the machine in Figs. 5, 6, and 7. The gear-wheels are placed on the horizontal shafts $B^1$ and $D^1$ and corresponding shafts of any desirable number of sets of rolls, the wheels of the whole train gearing into each other.

As no mandrel is needed in the employment of the apparatus described, it is obvious that my invention may be used in the reduction of solid bars, rods, wire, and the like, as well as of tubing.

I claim as my invention—

The combination, to form a machine for reducing the diameter of metal tubes, of a series of two or more sets of grooved rolls arranged in the following manner: first, each set consisting of three or more grooved rolls arranged at an angle to each other in such manner that their respective grooves coincide to form the reducing-pass of said set; second, the reducing-pass of each succeeding set being of a less diameter than that of the set immediately preceding throughout the series; and, third, the rolls of each set being so respectively placed that each roll is set out of plane with a corresponding roll in the set immediately preceding, substantially as and for the purposes set forth.

In testimony whereof I have hereunto signed my name this 5th day of April, A. D. 1879.

STEPHEN P. M. TASKER.

In presence of—
J. BONSALL TAYLOR,
WM. C. STRAWBRIDGE.